US009662829B2

(12) United States Patent
Hull

(10) Patent No.: US 9,662,829 B2
(45) Date of Patent: *May 30, 2017

(54) RETROFIT OF A FORM-FILL-SEAL MACHINE HEAT STATION WITH AN ADVANCED ULTRASONIC WELDING KIT

(71) Applicant: Rinco Ultrasonics USA Inc., Danbury, CT (US)

(72) Inventor: Gordon Hull, Newtown, CT (US)

(73) Assignee: Rinco Ultrasonics USA, Inc., Danbury, CT (US)

( * ) Notice: Subject to any disclaimer, the term of this patent is extended or adjusted under 35 U.S.C. 154(b) by 682 days.

This patent is subject to a terminal disclaimer.

(21) Appl. No.: 14/056,050

(22) Filed: Oct. 17, 2013

(65) Prior Publication Data

US 2015/0107781 A1 Apr. 23, 2015
US 2017/0008222 A9 Jan. 12, 2017

Related U.S. Application Data

(63) Continuation of application No. 13/713,237, filed on Dec. 13, 2012, now Pat. No. 8,591,679, which is a
(Continued)

(51) Int. Cl.
*B32B 37/00* (2006.01)
*B29C 65/08* (2006.01)
(Continued)

(52) U.S. Cl.
CPC .......... *B29C 65/08* (2013.01); *B29C 65/7882* (2013.01); *B29C 66/1122* (2013.01);
(Continued)

(58) Field of Classification Search
CPC ............... B29C 65/08; B29C 66/8322; B29C 66/81427; B29C 66/81433
(Continued)

(56) References Cited

U.S. PATENT DOCUMENTS 2,844,126 A 7/1958 Gaylord
2,899,875 A 8/1959 Leasure
(Continued)

FOREIGN PATENT DOCUMENTS

EP 0 967 161 A1 12/1999
EP 2 447 042 A2 5/2012
(Continued)

*Primary Examiner* — James Sells
(74) *Attorney, Agent, or Firm* — Thomas A O'Rourke; Bodner + O'Rourke, LLP

(57) ABSTRACT

Advanced ultrasonic welding components of co-pending application Ser. No. 12/925,652 are readily incorporated into new form-fill-seal machines, but owners of existing machines utilizing heat-seal stations were unsuccessful at swapping the sealing packages. Retrofit kits to a replace heat sealing station with an advanced ultrasonic sonotrode and anvil comprise: a housing; a linear rail fixed thereto; first and second bearing carriages being slidable upon the rail; and first and second fluidic muscles. Each of the fluidic muscles is mounted with a first end fixed to a respective housing wall, and a second end fixed to a respective bearing carriage, permitting actuation of each carriage through pressurization and depressurization of the muscles. The advanced anvil and sonotrode may be secured to respective carriages. In-line arrangements of anvil/sonotrode, bearing carriages, the first fluidic muscle, and the second fluidic muscle provides a narrow profile, permitting side-by-side kit installations for retrofits accomplishing duplex sealing on a horizontal machine.

16 Claims, 13 Drawing Sheets

Related U.S. Application Data continuation-in-part of application No. 12/925,652, filed on Oct. 26, 2010, now Pat. No. 8,376,016.

(60) Provisional application No. 61/569,916, filed on Dec. 13, 2011.

(51) Int. Cl.

| | | |
|---|---|---|
| *B29C 65/78* | (2006.01) | |
| *B29C 65/00* | (2006.01) | |
| *B65B 51/22* | (2006.01) | |
| *F15B 15/10* | (2006.01) | |
| *B29C 65/74* | (2006.01) | |
| *B65B 9/10* | (2006.01) | |
| *B29K 105/00* | (2006.01) | |
| *B29L 31/00* | (2006.01) | |

(52) U.S. Cl.
CPC ............ *B29C 66/244* (2013.01); *B29C 66/43* (2013.01); *B29C 66/43121* (2013.01); *B29C 66/816* (2013.01); *B29C 66/8167* (2013.01); *B29C 66/81427* (2013.01); *B29C 66/81431* (2013.01); *B29C 66/81433* (2013.01); *B29C 66/8242* (2013.01); *B29C 66/83* (2013.01); *B29C 66/8322* (2013.01); *B29C 66/83221* (2013.01); *B29C 66/849* (2013.01); *B29C 66/851* (2013.01); *B29C 66/86533* (2013.01); *B29C 66/876* (2013.01); *B65B 51/225* (2013.01); *B29C 65/7451* (2013.01); *B29C 66/3022* (2013.01); *B29C 66/71* (2013.01); *B29C 66/73772* (2013.01); *B29C 66/73774* (2013.01); *B29C 66/73921* (2013.01); *B29C 66/81417* (2013.01); *B29C 66/9513* (2013.01); *B29C 66/9516* (2013.01); *B29C 66/9517* (2013.01); *B29K 2105/256* (2013.01); *B29L 2031/7128* (2013.01); *B65B 9/10* (2013.01); *F15B 15/103* (2013.01); *Y10T 29/49716* (2015.01)

(58) Field of Classification Search
USPC .............. 156/73.1, 580.1, 580.2, 581, 583.1
See application file for complete search history.

(56) References Cited

U.S. PATENT DOCUMENTS

| | | |
|---|---|---|
| 2,946,119 A | 7/1960 | Jones et al. |
| 3,224,915 A | 12/1965 | Balamuth et al. |
| 3,948,705 A | 4/1976 | Ausnit |
| 4,029,538 A | 6/1977 | Vance, Jr. |
| 4,117,647 A | 10/1978 | Rossi |
| 4,161,420 A | 7/1979 | Clarke et al. |
| 4,288,965 A | 9/1981 | James |
| 4,373,982 A | 2/1983 | Kreager et al. |
| 4,517,790 A | 5/1985 | Kreager |
| 4,532,753 A | 8/1985 | Kovacs |
| 4,534,818 A | 8/1985 | Kreager et al. |
| 4,537,016 A | 8/1985 | Shanklin et al. |
| 4,666,536 A | 5/1987 | Van Erden et al. |
| 4,807,420 A | 2/1989 | Barker |
| 4,819,411 A | 4/1989 | Konzal et al. |
| 5,244,532 A | 9/1993 | Wadium et al. |
| 5,547,284 A | 8/1996 | Imer |
| 5,605,026 A | 2/1997 | Schott et al. |
| 5,678,390 A | 10/1997 | Pruett et al. |
| 5,826,403 A | 10/1998 | Haley |
| 5,843,540 A | 12/1998 | Heydarpour et al. |
| 6,029,428 A | 2/2000 | Terminella et al. |
| 6,066,216 A | 5/2000 | Ruppel, Jr. |
| 6,135,339 A | 10/2000 | Parrini |
| 6,178,722 B1 | 1/2001 | McMahon |
| 6,199,848 B1 | 3/2001 | Bellandi et al. |
| 6,212,859 B1 | 4/2001 | Bielik |
| 6,379,483 B1 | 4/2002 | Eriksson |
| 6,554,931 B1 | 4/2003 | Blanchard et al. |
| 6,554,957 B2 | 4/2003 | Urlaub |
| 6,562,166 B2 | 5/2003 | Molander et al. |
| 6,574,944 B2 | 6/2003 | Capodieci |
| 6,691,491 B2 | 2/2004 | Terminella et al. |
| 6,748,723 B2 | 6/2004 | Wadium et al. |
| 6,780,263 B2 | 8/2004 | Delisle |
| 6,790,312 B2 | 9/2004 | Cosaro et al. |
| 6,835,257 B2 | 12/2004 | Perrine |
| 6,928,794 B2 | 8/2005 | Hamer et al. |
| 6,986,232 B1 | 1/2006 | Kume et al. |
| 7,018,493 B2 | 3/2006 | Altmeyer et al. |
| 7,082,737 B2 | 8/2006 | Van Rens et al. |
| 7,234,285 B2 | 6/2007 | Kinigakis |
| 7,275,354 B2 | 10/2007 | Frievalt et al. |
| 7,322,169 B2 | 1/2008 | Kettner et al. |
| 7,571,810 B2 | 8/2009 | Tilton |
| 7,584,670 B2 | 9/2009 | Myers |
| 7,681,378 B2 | 3/2010 | Brormann et al. |
| 7,722,254 B2 | 5/2010 | Murray |
| 7,734,276 B2 | 6/2010 | Harrington |
| 7,793,815 B2 | 9/2010 | Shimizu et al. |
| 8,376,016 B2 | 2/2013 | Hull |
| 8,591,679 B1 * | 11/2013 | Hull .............................. 156/73.1 |
| 8,689,850 B2 * | 4/2014 | Hull .......................... 156/580.2 |
| 2008/0000202 A1 | 1/2008 | Kettner et al. |
| 2015/0107781 A1* | 4/2015 | Hull .......................... 156/580.1 |

FOREIGN PATENT DOCUMENTS

| | | |
|---|---|---|
| GB | 1 216 743 | 12/1970 |
| JP | H08-24314 A | 1/1996 |

\* cited by examiner

RETROFIT OF A FORM-FILL-SEAL MACHINE HEAT STATION WITH AN ADVANCED ULTRASONIC WELDING KIT

CROSS REFERENCES TO RELATED APPLICATIONS

This application is a continuation of U.S. Non-Provisional application Ser. No. 13/713,237, filed on Dec. 13, 2012, which claims priority on U.S. Provisional Application Ser. No. 61/569,916, filed on Dec. 13, 2011, and is a continuation-in-part of U.S. patent application Ser. No. 12/925,652, filed Nov. 26, 2010, titled "Sonotrode and Anvil Energy Director Grids for Narrow/Complex Ultrasonic Welds of Improved Durability," with the disclosures of each being incorporated herein by reference.

FIELD OF THE INVENTION

The present invention relates to improvements in form-fill-seal machines, and more particularly to apparatus which are capable of being retrofit onto such machines to improve the machine's productivity through replacement of old-technology heat-sealing elements using a kit comprising an advanced ultrasonic welding stack and anvil.

BACKGROUND OF THE INVENTION

The packaging of food and other products with a sheet of flexible plastic film through an automated process using a machine is typically achieved by butting and sealing the plastic film to form a pouch. There are numerous examples of such machines, which are referred to within the industry as form-fill-seal machines, and which may be further subdivided into categories as being either horizontal, vertical, or rotary form-fill-seal machines. An example of a horizontal form-fill-seal machine is shown by U.S. Pat. No. 5,826,403 to Haley; an example of a vertical form-fill-seal machine is shown by U.S. Pat. No. 4,117,647 to Rossi; while an example of a rotary form-fill-seal machine is shown by U.S. Pat. No. 6,212,859 to Bielik.

For a substantial period of time, these form-fill-seal machines utilized heat elements, such as the "heated fin wheels" of the Haley device, to seal the package bottom and its side seam to create a pouch, and after filling that pouch with product, a final heat element would seal the top open end of the pouch to form the package. An early marriage of ultrasonic welding principles for sealing of plastic films with a packaging machine is shown by the 1981 U.S. Pat. No. 4,288,965 to James, for a "Form-Fill-Seal Packaging Method and Apparatus." Ultrasonic welding has since become the preferred method of sealing, because, among other reasons, ultrasonic weld times are less than one second in duration, the process lacks the potential for damage to the packaging material or product from an excessive application of heat, for which traditional heating elements are susceptible, and because the ultrasonic welding process is much better suited to seal through contaminants and product, which the heat sealing process accomplishes poorly, if at all.

Our above-noted co-pending U.S. patent application Ser. No. 12/925,652 for "Sonotrode and Anvil Energy Director Grids for Narrow/Complex Ultrasonic Welds of Improved Durability," furthers this divide. The technology disclosed therein makes even more advantageous the use of ultrasonic welding over heating elements, as it reduces the necessary material, by allowing for a narrower weld, while also simultaneously producing welds of improved durability, which is highly desirable particularly for the packaging of liquid, semi-liquid, and even for the packaging of solids or semi solid products. Of course, the process could still be used to produce wider welds, where they may be desired, for example for aesthetic purposes, rather than for being needed to produce a stronger, more durable seal.

However, while that patent-pending technology may easily be incorporated into newly designed form-fill-seal packaging machines, consumers who either recently or long ago purchased machines that seal through the direct application of heat have been at an impasse. The owner's of those machines do not wish or simply cannot afford the expense of a new array of packaging machines, nor can they afford to not produce packaging with the durability that their competitors will soon be utilizing through the use of machines incorporating this new apparatus. The problem has one added dimension of complexity.

The different types of packaging machines may dictate forming the pouch in different stages and at different locations within the machine. In addition, it is common to have at least one or even multiple heat seal stations just for the final top end sealing of multiple product-filled pouches. Therefore, it is highly desirable to incorporate our patent-pending ultrasonic welding technology onto existing machines, but attempts to accomplish such a retro-fit by package machine operators has been unsuccessful, because of the space-constrained volume allocated to the replacement unit. The current invention discloses an adaptable retrofit kit and method for successfully accomplishing retrofitting of the heat station for different kinds of form-fill-seal machines.

OBJECTS OF THE INVENTION

It is an object of the invention to provide a means of retrofitting the heat station of a form-fill-seal machine with advanced ultrasonic welding equipment.

It is another object of the invention to provide a means of retrofitting a space-constrained volume of a form-fill-seal or pre-made pouch type machine with a kit comprising advanced ultrasonic welding equipment.

It is a further object of the invention to provide a versatile retrofit kit for replacing a heat station with a kit comprising advanced ultrasonic welding, for either a horizontal or a rotary type of form-fill-seal or pre-made pouch type machine.

It is another object of the invention to provide a retrofit kit for advanced ultrasonic weld sealing of two or more product pouches simultaneously.

Further objects and advantages of the invention will become apparent from the following description and claims, and from the accompanying drawings.

SUMMARY OF THE INVENTION

Advanced ultrasonic welding components of our co-pending application Ser. No. 12/925,652 are readily incorporated into the design of new form-fill-seal machines, but the owners of older machines, which utilize heat-seal stations, were unsuccessful at devising suitable apparatus and methods for retrofit of the sealing equipment. A retrofit that adeptly replaces the older heat sealing station of either horizontal or rotary form-fill-seal machines, with an advanced ultrasonic sonotrode and anvil of our co-pending application, may comprise the following kit: a housing; a linear rail fixed to the housing; at least first and second bearing carriages being slidable upon the rail; and first and second fluidic muscles. Each of the fluidic muscles may be mounted with a first end being fixed to a respective housing wall, and a second end being fixed to a respective bearing carriage. Attachment to the respective bearing carriage may be through attachment of each muscle to a respective mounting member that may be fixed to respective mounting blocks, which are then fixed to the bearing carriages. The advanced anvil and sonotrode may be secured to respective carriages.

Actuation of each carriage may be through the pressurization of the fluidic muscles, which in turn causes cyclic expansion of the chamber of each muscle, which is accompanied by linear contraction along its length. The contraction of each fluidic muscle causes simultaneous converging translation of the first and second mounting members relative to the linear rail, to cause engagement of a surface of the anvil with a surface of the sonotrode. Synchronizing the electrical power to the stack to correspond to this period of engagement, permits sealing of pouches that are moved along a conveyor or Rotary dial and positioned between the anvil and sonotrode. Depressurization of the fluidic muscles causes reverse translation and disengagement of the anvil from the sonotrode, after which the conveyor or rotary dial may advance to cause exiting of the sealed pouch, and positioning of another unsealed pouch between the anvil/sonotrode combination.

Specially configured in-line arrangements of the anvil/sonotrode, the bearing carriages, the first fluidic muscle, and the second fluidic muscle, serve to provide a very narrow profile, which permits side-by-side kit installations for a retrofit that accomplishes duplex, triplex, or more sealing of pouches on a horizontal machine.

DETAILED DESCRIPTION OF THE INVENTION

Initial attempts by package machine operators to retrofit existing form-fill-seal machines with the ultrasonic welding technology of our co-pending application Ser. No. 12/925,652, was unsuccessful. The volume that could be occupied by the retrofit apparatus was extremely constrained. This constraint was exacerbated by the scenario where a duplex or triplex sealing operation was required at the heat station. A single large horn and anvil being moved to engage each other using conventional actuators were too slow to achieve satisfactory results or outside the realm of single width ultrasonic horn technology. Using two different pairs of horn/anvil combinations was unsatisfactory because of the difficulty in calibrating synchronous engagement of the pairs while the forces generated were too small, and resort to a servo-motor was considered for synchronization, but found to be overly expensive for the application, as it would diminish its marketability.

Figure 1:
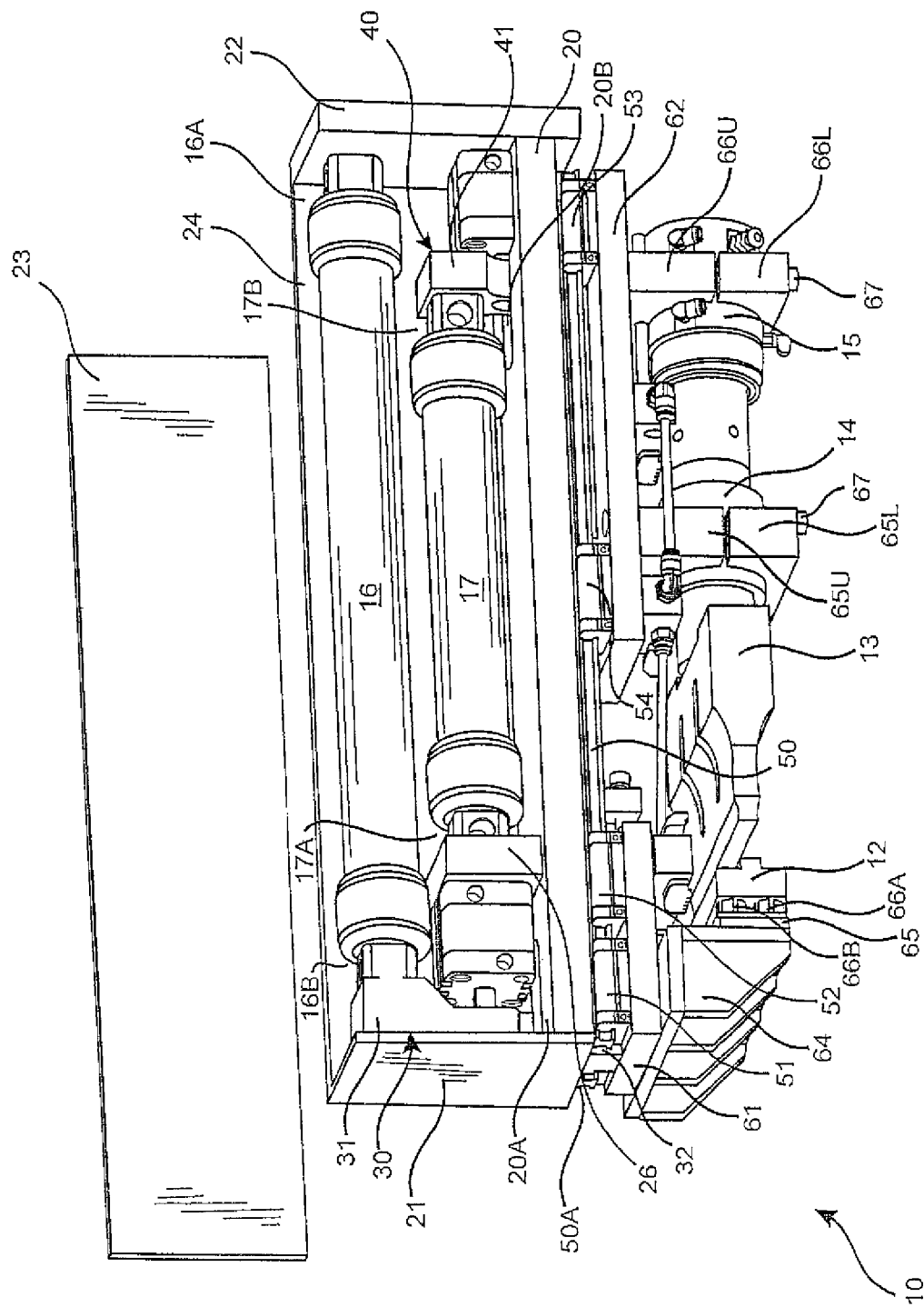
FIG. 1 is a perspective view of a first embodiment of the main components of an advanced ultrasonic welding retrofit kit of the current invention, with a housing side panel removed to expose the fluid mechanical muscles therein.

FIG. 1 shows a perspective view of a first embodiment of the retrofit kit 10 of the present invention, which elegantly overcame these obstacles, being shown with a housing side panel 23 removed to expose the actuation portion of the invention.

The device utilizes a pair of fluidic mechanical muscles in a specially created dual linear mechanism for simultaneous actuation of both the anvil and the horn/booster/converter stack. Today's "Fluidic Muscle," as it is commonly termed (along with pneumatic artificial muscle), is in part the progeny of an invention by Richard Gaylord. Gaylord, in 1955, received U.S. Pat. No. 2,844,126 for a "Fluid Actuated Motor System and Stroking Device," In general, a fluidic muscle may be constructed by wrapping a synthetic or natural rubber tube with a woven sheath. This forms an expansible chamber. When a pressurized fluid is applied to the chamber of the fluidic muscle, the chamber expands radially and is accompanied by a corresponding contraction in its length, resulting in linear motion. Metallic or plastic fittings may be secured at both ends to transmit the resultant motion.

The retraction strength of the muscle may be determined by the total strength of the individual fibers forming the woven sheath, while its exertion distance may be determined according to the tightness of the weave, where a looser weave may allow greater bulging, resulting in further twisting of the individual fibers in the weave. Fluidic muscles for use with the current invention may be obtained from the Festo Corporation, located in Mt. Prospect, Ill. (see www.festo.com).

Fluidic muscles are commonly utilized in pairs—one agonist and one antagonist, where the antagonist acts in opposition to the motion of the agonist, thereby mimicking the functioning of muscles within the human body (e.g., an extensor muscle that opens a joint and a flexor muscle to act in opposition to close the joint). However, in this invention, the fluidic muscles operate in a different mode.

In the simplest possible embodiment, a single fluidic muscle may be used to replicate the linear motion provided by the press 190 in a typical prior art ultrasonic welding machine 100, represented in FIGS. 13A and 13B. However, in practice, this is not very conducive to the successful retrofitting of many form-fill-seal machines, particularly for a horizontal type machine. In such machines, because the pouch(s) may translate along a conveyor towards a heat station (see e.g., packaging machine 5 in FIG. 1 of U.S. Pat. No. 5,826,403 to Haley), where one or more heating elements may converge upon the pouch(s) to seal it, it is highly desirable to impart motion to both the anvil and the sonotrode. This dual motion may be set so as to have the sonotrode and anvil generally converge at the mid-plane of the opening to thereat apply pressure and vibration energy necessary for localized heating and melting of the plastic film to seal the opening.

Figure 2:
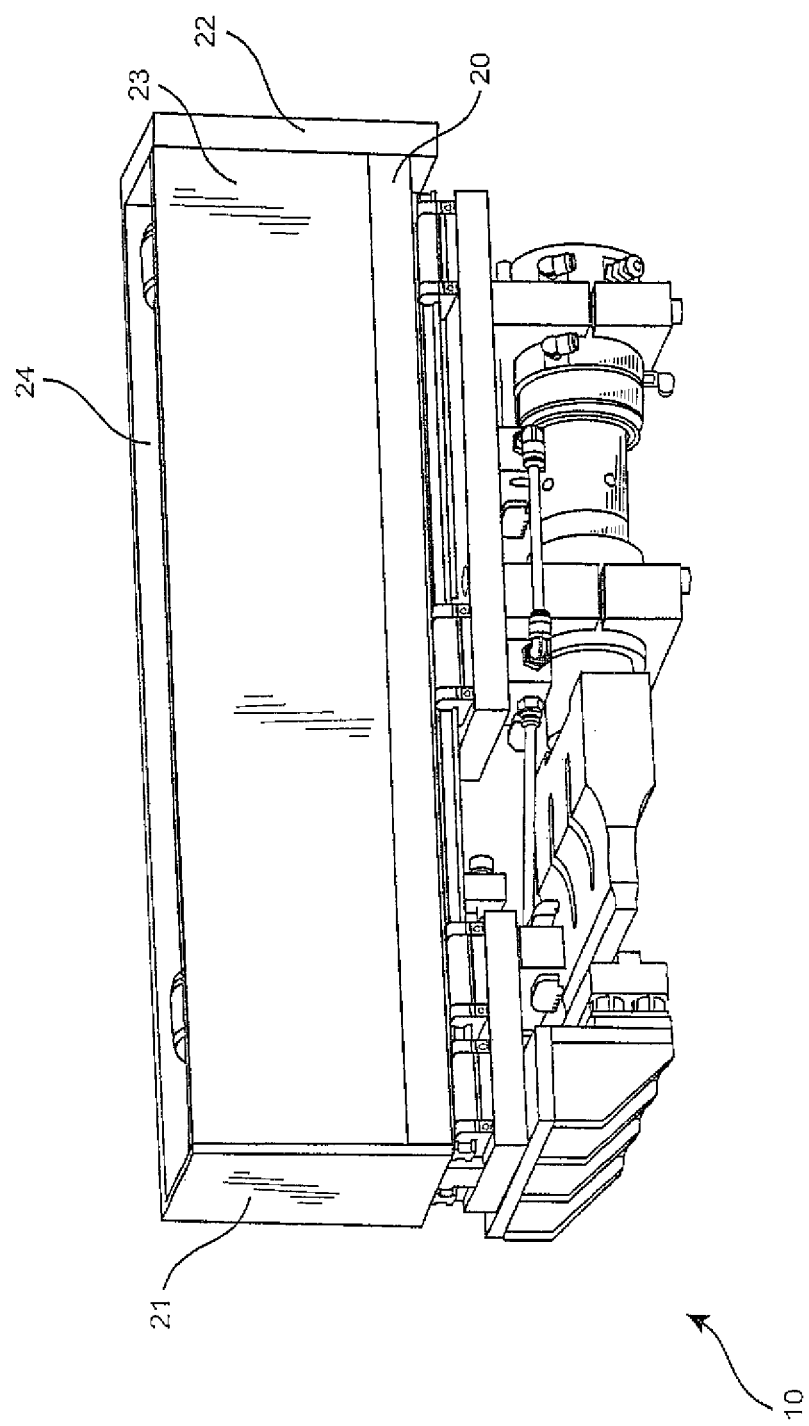
FIG. 2 is a perspective view of the retrofit kit of FIG. 1, with the housing panel shown installed to enclose the fluid mechanical muscles.
Figure 7:
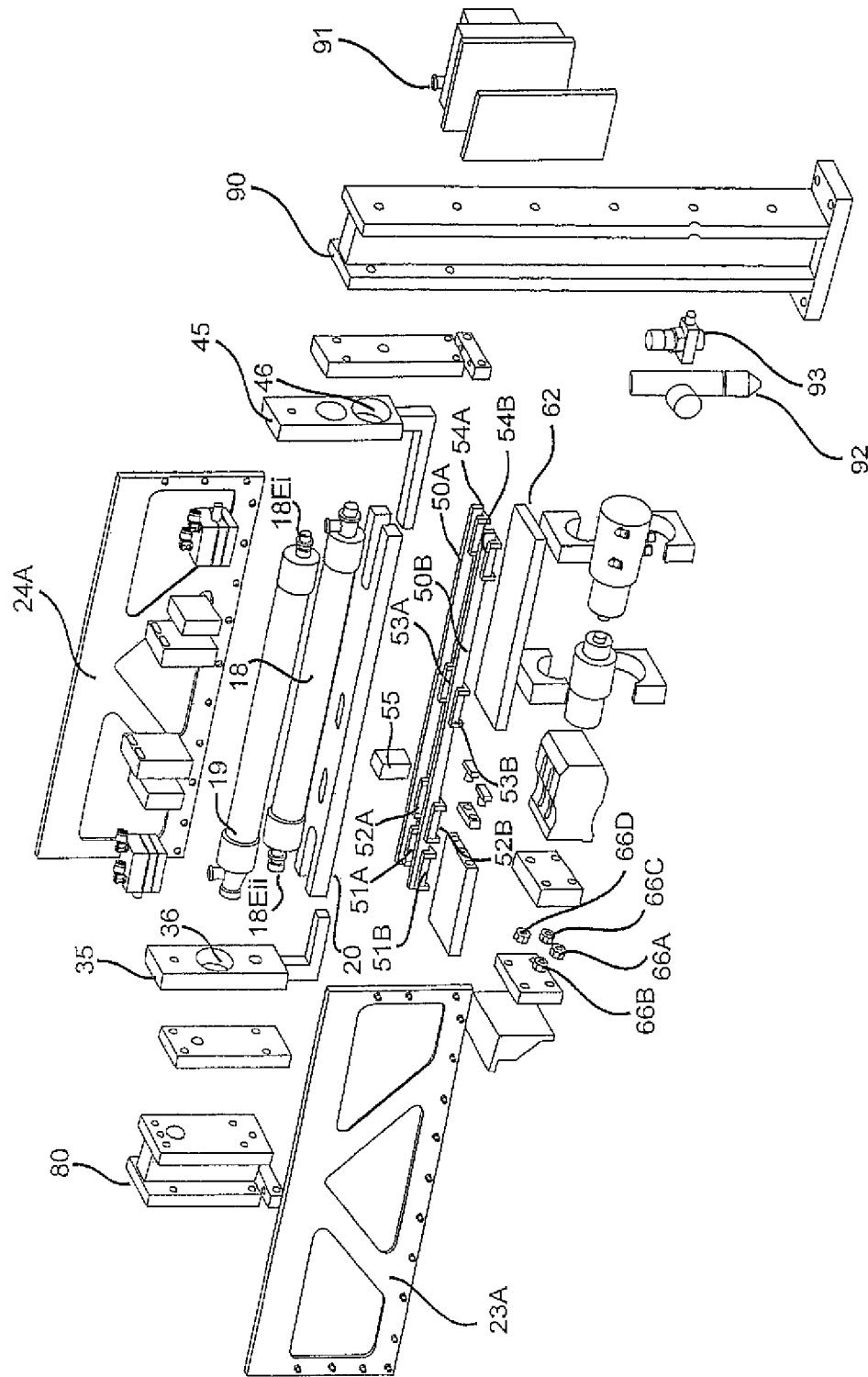
FIG. 7 is an exploded view of the parts comprising the retrofit kit, as seen in FIG. 6.

A first embodiment of the present invention is shown by the retrofit kit 10 in FIG. 1 (with a side panel 23 of the housing removed), and is also shown in FIG. 2. The retrofit kit 10, which may be used in the replacement of one or more heat sealing elements of either a horizontal or a rotary form-fill-seal machine, may include a housing having a base 20, a first end wall 21, a second end wall 22, a first side wall 23, and a second side wall 24. The housing may also comprise a mid-wall 26. Many of these components are common to a later discussed embodiment, for which an exploded view is shown in FIG. 7, so reference thereto may be advantageous. The housing side panels 23 and 24 may be used to enclose and protect the fluidic muscles, along with the base 20 and end walls 21 and 22, and in addition, an optional cover (not shown) may be used for those reasons as well. Also, side panels 23 and 24 may serve to add structural rigidity to the housing; however, the panels 23 and 24 are not required for supporting the functionality of the mechanism, as will be seen hereinafter.

The base 20 may have a first opening 20A and a second opening 20B, both of which may be slotted openings. A first mounting member 30 may have a portion being disposed part-way through the first opening 20A in base 20. In one embodiment, first mounting member 30 may preferably be "L"-shaped, and may have one leg 31 of the "L" protruding up through the opening 20A in base 20, and the other leg 32 may be disposed so as to generally parallel the base 20 of the housing. The first mounting member 30 may therefore be slidable within the slotted opening 20A of the base 20 of the housing. A second mounting member 40 may be similarly constructed with first and second legs 41 and 42, and be correspondingly disposed so as to be slidable within the second opening 20B in the base. The ends of the second legs 32 and 42 of the "L"-shaped mounting members may face each other within the kit assembly.

The second legs 32 and 42 of the "L"-shaped mounting members 30 and 40 may each be attached to at least one respective bearing carriage, which may be slidable upon a linear rail. In a preferred embodiment, a linear rail with four bearing carriages being slidable thereon may be used. Linear rails and bearing carriages are commercially available, and may be obtained from PBC Linear, in Roscoe, Ill. (see www.pbclinear.com/Pages/Linear-Components, the disclosures of which are incorporated herein by reference). A linear rail 50 may be secured to the bottom of base 20, and may have bearing carriages 51, 52, 53, and 54 being slidable thereon, as seen in FIG. 1. Depending upon the linear rail selected, and the method utilized for attachment to the housing base 20, it is possible for the second leg 32 of the "L"-shaped mounting member 30 to attach directly to the bearing carriages 51 and 52, with the second leg 42 of the "L"-shaped mounting member 40 attaching directly to the bearing carriages 53 and 54.

Figure 8:
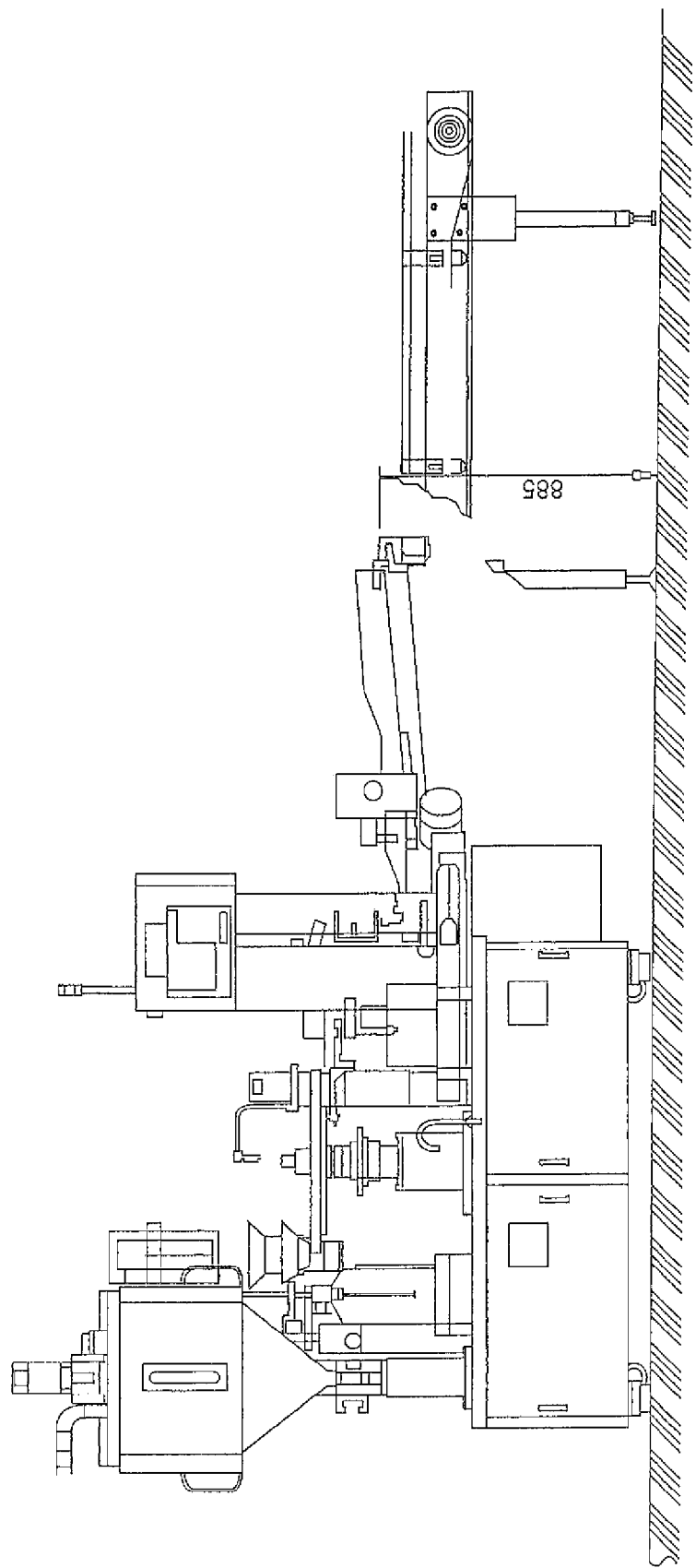
FIG. 8 is a front view of a rotary form-fill-seal machine capable of being retrofitted with the advanced ultrasonic welding retrofit kit of FIG. 6.

Alternatively, and as may be seen in FIG. 8, a split linear rail 50A and 50B may be used, with pairs of bearing carriages 51A, 51B, 52A, 52B, 53A, 53B, 54A, and 54B being slidable upon the rail pair 50A/50B, and with carriages 51A, 51B, 52A, and 52B being secured to a mounting block 61, and with carriages 53A, 53B, 54A, and 54B being secured to a mounting block 62. As seen in FIG. 1, the opening formed between the split rails 50A/50B and bearing carriage pairs may serve to permit attachment of the second leg 32 of the first "L"-shaped member 30 to mounting block 61, and permit attachment of the second leg 42 of the second "L"-shaped member 40 to mounting block 62. (Note—attachment of any of the housing components or other parts described herein may be accomplished using a suitable adhesive or any mechanical fasteners know in the art to be appropriate for the materials used, which may be wood, metal, or plastic). With the length of the linear split rails 50A/50B selected to span the slotted openings 20A and 20B in base 20, the first mounting member 30 may thereby be slidable with respect to the first end of the housing, being proximate to the housing end wall 21, within slotted opening 20A. The second mounting member 40 may thereby be slidable with respect to the second end of the housing, being proximate to the housing end wall 22, within slotted opening 20B.

An advanced anvil 12, which incorporates the features disclosed in co-pending application Ser. No. 12/925,652, may be secured to the mounting block 61. In a preferred embodiment, an angled gusset assembly 64 may first be secured to the mounting block 61, and then the anvil 12 may be secured to the gusset assembly 64. To accommodate the build-up of tolerances and to generally permit adjustments to the precise static positioning of the anvil, the importance of which is discussed hereinafter, a base plate 65 may be located between the gusset assembly 64 and the anvil 12, and leveling feet may be positioned between the base plate 65 and the anvil 12.

An advanced sonotrode 13, which incorporates features disclosed in co-pending application Ser. No. 12/925,652, may form part of a stack that also includes a booster 14 and a converter 15. The stack may be secured to the mounting block 62 using upper and lower clamp blocks 65U/65L that secure the booster, and upper and lower clamp blocks 66U/66L that secure the converter. The upper clamp blocks 65U and 66U may each be fixedly secured to the mounting block 62, and the lower clamp blocks 65L and 66L may each be releasably secured to the corresponding upper clamp blocks using set screws 67, to releasably secure the stack to the mounting block 62.

Figure 3:
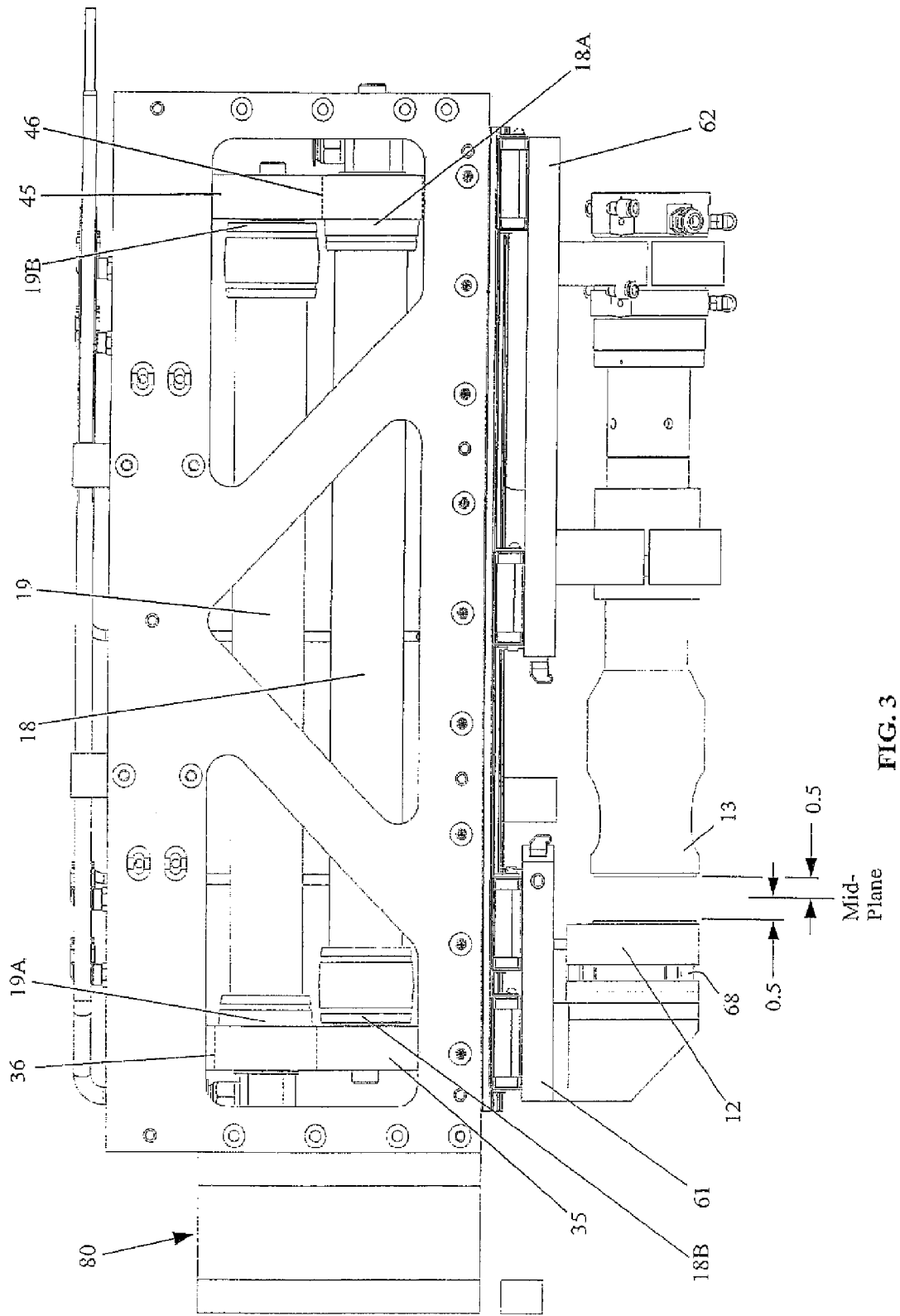
FIG. 3 is an enlarged side view of a second embodiment of the retrofit kit of the current invention.
Figure 11:
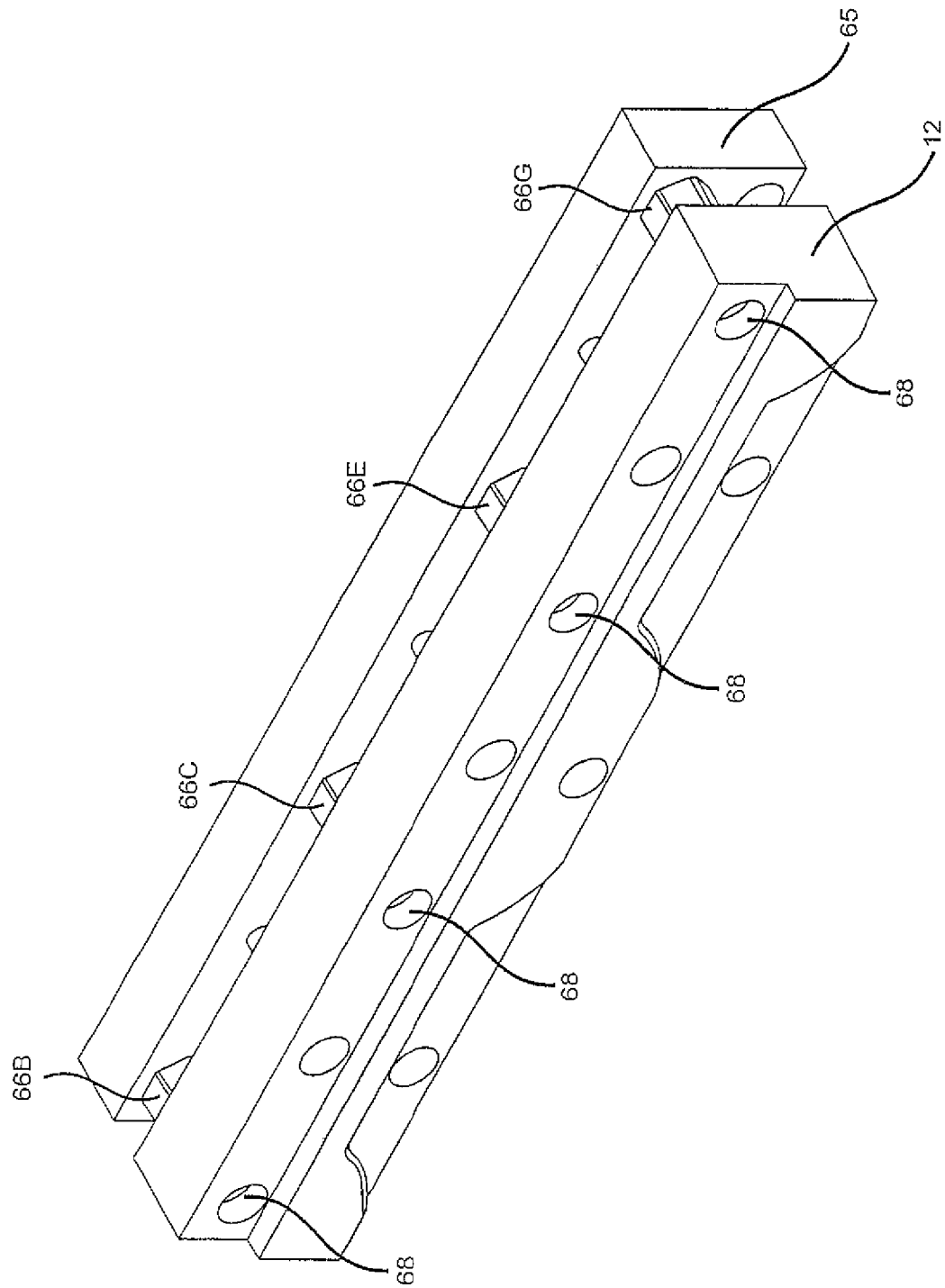
FIG. 11 is a detail view of an anvil that is usable with the present invention, along with leveling feet and a mounting base that is securable to the housing herein.
Figure 12:
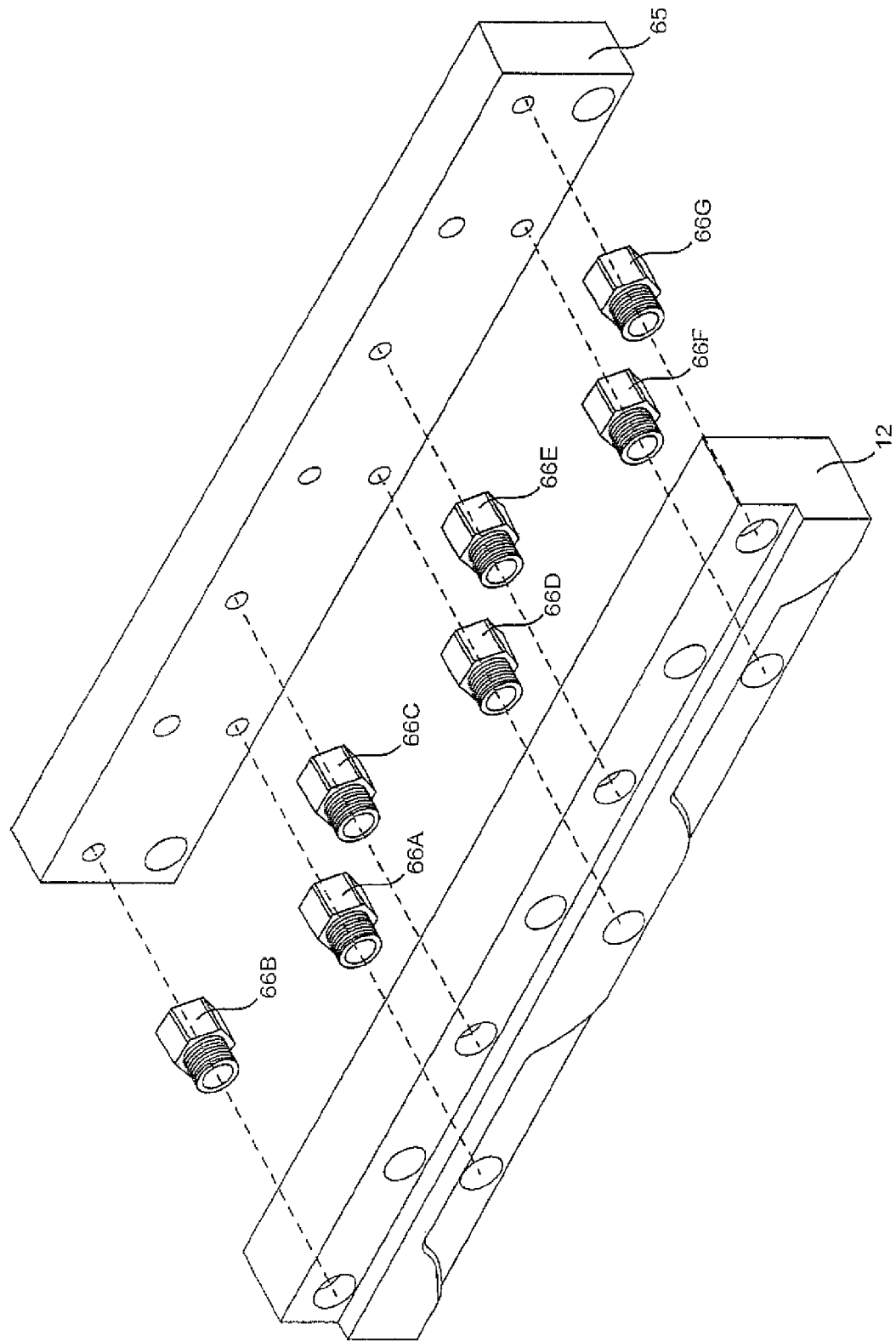
FIG. 12 is an exploded view of the anvil, leveling feet, and mounting base of FIG. 11.

One embodiment of the leveling feet, base, and anvil is shown in an exploded view in FIG. 12. In the embodiment of FIG. 12, leveling feet 66A, 66B, 66C, 66D, 66E, 66F, and 66G are shown prior to being threadably engaged within corresponding threaded holes in the anvil 12, after which the anvil and mounting feet may be secured to the base and to the gusset assembly 64 using screws 68, as seen in FIG. 11 and FIG. 3. The degree to which each of the mounting feet 66A-66G are threadably engaged therein may be adjusted—inward and outward—in order to provide carefully controlled and adequate support across the length of the anvil 13, so that its series of energy director grids, as described in co-pending application Ser. No. 12/925,652, may properly engage the corresponding series of energy director grids of the advanced sonotrode 13. A contact sheet may be utilized between the energy director grids of the sonotrode and the anvil, during their engagement, which is discussed hereinafter, to determine if the engagement is proper, with adjustments to the leveling feet being made to achieve uniform contact therebetween.

With this arrangement of FIG. 1, a first fluidic muscle 16 may have a first end 16A being fixed to the second end wall 22 of the housing, and a second end 16B of fluidic muscle 16 may be fixed to the first leg 31 of "L"-shaped mounting member 30. A second fluidic muscle 17 may have a first end 17A being fixed to the housing mid-wall 26 of the housing, and a second end 17B of fluidic muscle 17 may be fixed to the first leg 41 of "L"-shaped mounting member 40. The fluidic muscles 16 and 17 may preferably be attached as described to also be disposed in-line, relative to the linear rail 50 and to the anvil 12 and the stack with sonotrode 13. This in-line arrangement creates an assembly that possesses a very narrow, though elongated shape, which facilitates installation of the retrofit kit 10 into a space constrained envelope currently occupied by the heat seal station of certain form-fill-seal machines (see generally FIGS. 3 and 4, which illustrate installation of a second retrofit kit embodiment 10A of the present invention onto such a machine).

With the retrofit kit 10 being assembled as described above, and with pneumatic/hydraulic tubes being appropriately installed to port pressure to the fluidic muscles 16 and 17, pressurizing of the first and second fluidic muscles may cause translation of the first muscle mounting member 30 and translation of the second muscle mounting member 40, with the translation being generally simultaneous and being relative to the linear rail, and with it causing convergence of the two mounting member so as to cause engagement of a surface of the anvil 12 with a surface of the sonotrode 13. A controller may be used to sequence porting of pneumatic/hydraulic pressure to the fluidic muscles and corresponding depressurizing, with the pulsing of electric power to the stack to cause the mechanical vibrations that creates friction between the "work piece" materials (the sides of the open end of the pouch) to generate heat to melt the contact area therebetween. Depressurizing of the first and second fluidic muscles 16 and 17 may cause reverse-translation of the first and second muscle mounting members 30 and 40 relative to the linear rail pair 50A/50B to cause disengagement of (or separation between) the engaging surface of the anvil 12 and the engaging surface of said sonotrode 13, after an appropriate weld time has elapsed.

The translation of the two mounting members 30 and 40 need not be simultaneous, but it is important that the engaging surface of the anvil 12 and the engaging surface of the sonotrode 13 meet at a prescribed "mid-plane," where the pouch is positioned. As seen in FIG. 7, a mechanical stop 55 may be used to institute a travel limiting set point so that when the fluidic muscles are activated, the anvil and sonotrode will suitably mesh in the middle. Typically the anvil side reaches the mid-plane first, since there is less mass to move, and it's travel will thereat be limited by contact with the mechanical stop 55. The horn side will thereafter come into contact with the anvil in the middle, as set by the adjustable mechanical stop 55. Without the adjustments provided by the mechanical stop 55, any differential in reaching the pouch may otherwise serve to cause deflection of the pouch, resulting in a distorted weld line, and an aesthetically unappealing package. Having two different sized fluidic muscles 16 and 17 may require some additional adjustment to the arrangement to coordinate the arrival times of the anvil 12 and sonotrode 13 at the plane where the pouch is to be sealed. If the first and second fluidic muscles are the same size, certain efficiencies may be obtained.

Figure 3A:
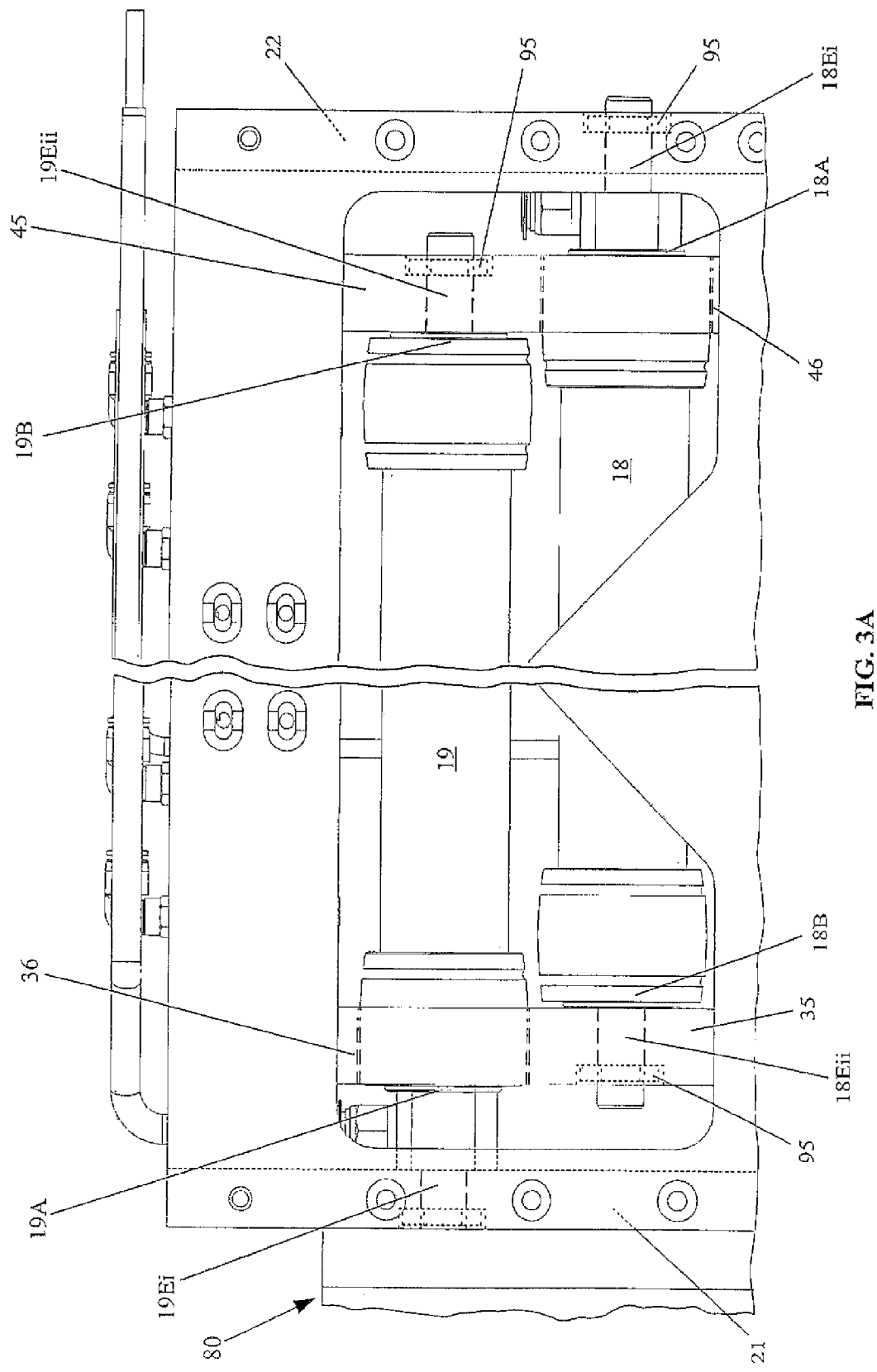
FIG. 3A is a further enlarged view of the retrofit kit of FIG. 3.
Figure 4:
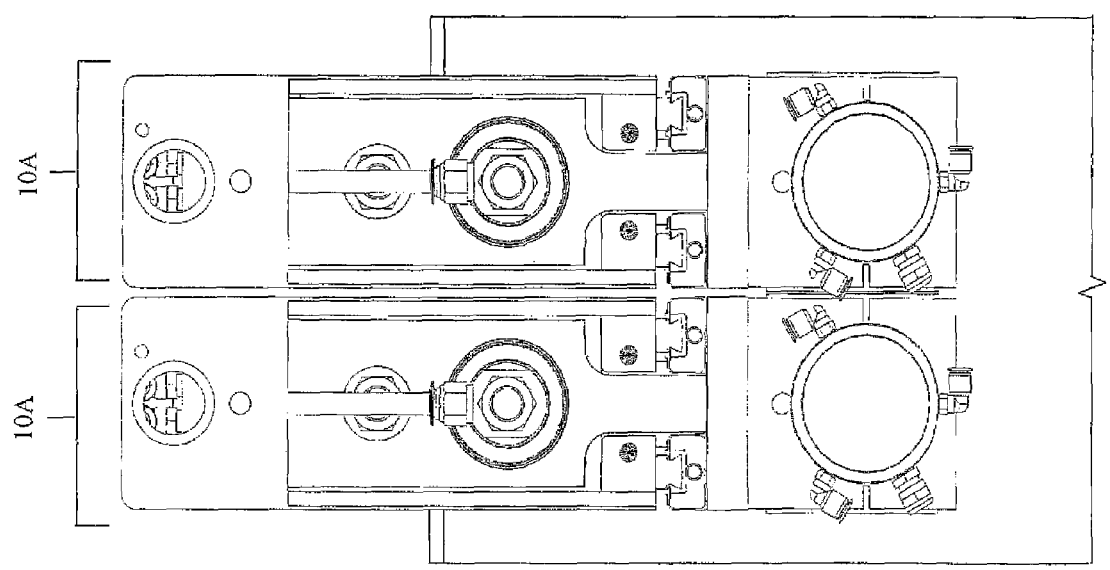
FIG. 4 is an end view of the retrofit kit of FIG. 3.

A second embodiment 10A of the retrofit kit of the current invention is shown mounted to a horizontal form-fill-seal machine in FIGS. 3 and 4. This installation of the kit 10A is shown enlarged in FIGS. 3A, and has its component parts shown in the exploded view of FIG. 7. The kit 10A may make use of two identical fluidic muscles 18 and 19, and may therefore be capable of simultaneous and equal translation amounts for both the anvil 12 and sonotrode 13, largely eliminating the need for adjustments due to different travel distances or times. In FIG. 3, it may be seen that the engaging surface of the anvil 12 and the corresponding engaging surface of the sonotrode 13 may each be located, prior to pressurization of the fluidic muscles and the associated translation, approximately 0.5 inches away from the mid-plane at which the pouch to be sealed may ideally be positioned. Utilizing the same fluidic muscle 19 for translation of the sonotrode 13 on the slidably mounted block 62, as the fluidic muscle 18 for translation of the anvil 12 on the slidably mounted block 61, may also result in equal speeds of translation.

Inline positioning of the same fluidic muscles 18/19 may be accomplished, as seen in FIGS. 3A and 7 for this second embodiment, by providing a clearance hole 36 in the first mounting member 35 to permit sliding of the first mounting member relative to the fluidic muscle 19 without any contact occurring therebetween, and by providing a clearance hole 46 in the second mounting member 45 to permit sliding of the second mounting member 45 relative to the fluidic muscle 18 without any contact occurring therebetween. Many other aspects of retrofit kit 10A may otherwise be similarly constructed to retrofit kit 10. The first end 18A of the fluidic muscle 18 may be secured to the housing, albeit by passing through the oversized orifice 46 in the second mounting member 45, and possibly being with the use of an extended end fitting 18Ei on the fluidic muscle, with the fitting having a threaded portion thereon to which a nut 95 may torqued to secure it to the housing end wall 22. The second end 18B of the fluidic muscle 18 may also have an extended end fitting 18Eii with a threaded portion thereon to which a nut 95 may be torqued to secure it to the first mounting member 35. Also, the first end 19A of the second fluidic muscle 19 may be secured to the housing, albeit by passing through an oversized orifice 36 in said first mounting member 35, and possibly being with the use of extended end fitting 19Ei on the fluidic muscle, with the fitting having a threaded portion thereon to which a nut 95 may torqued to secure it to the housing end wall 21. The second end 19B of the fluidic muscle 19 may also have an extended end fitting 19Eii with a threaded portion thereon to which a nut 95 may be torqued to secure it to the first mounting member 45.

Figure 9:
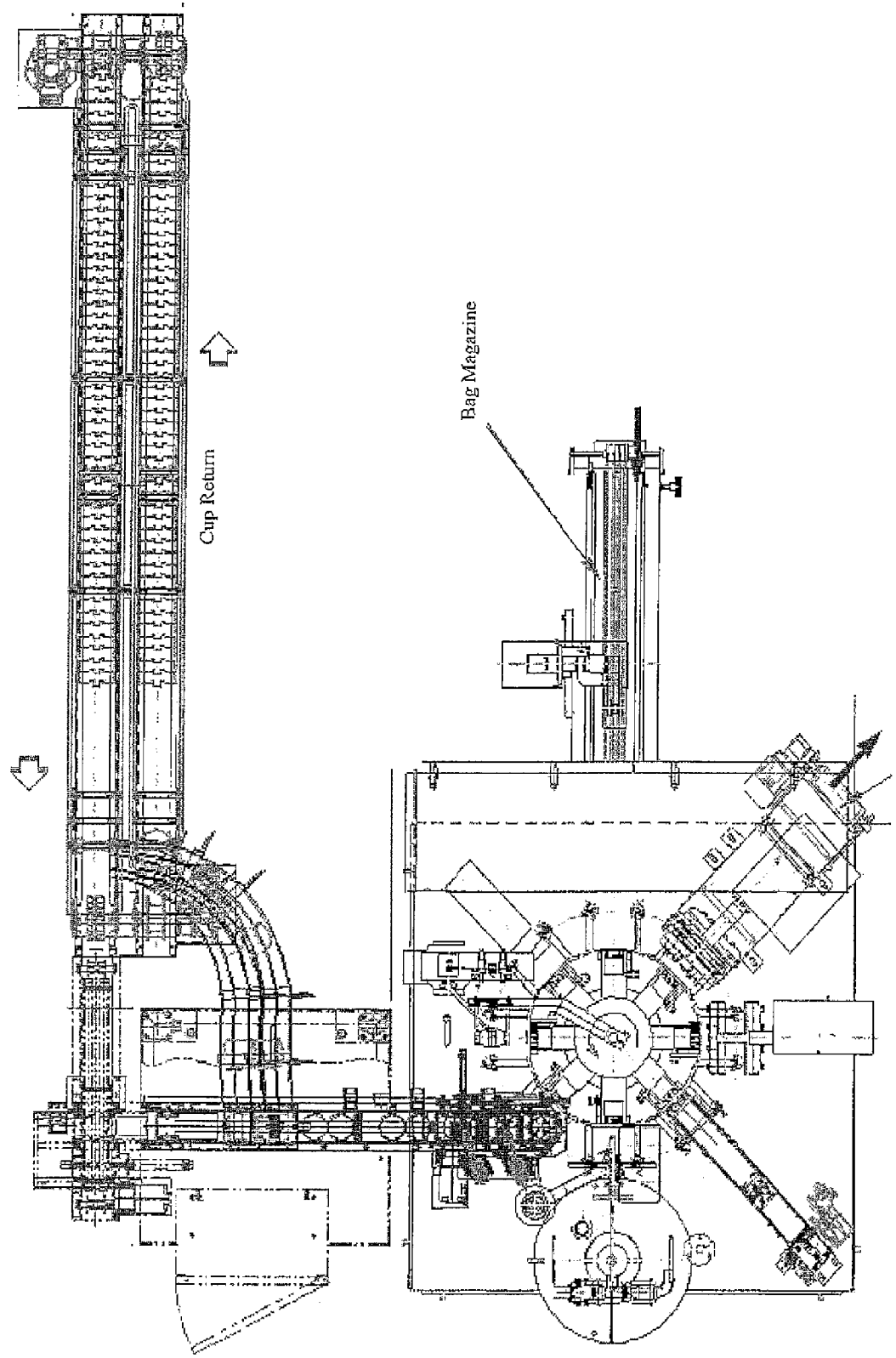
FIG. 9 is a top view of the rotary form-fill-seal machine of FIG. 8.
Figure 10B:
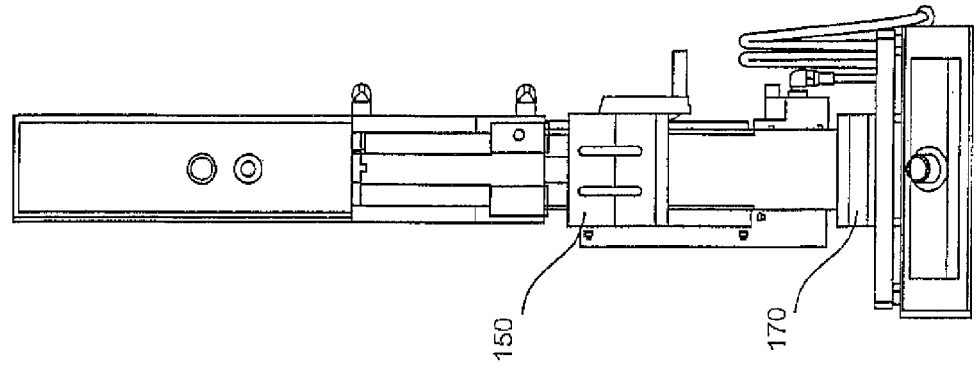
FIG. 10B is a front view of the prior art ultrasonic welding machine of FIG. 10A.
Figure 10A:
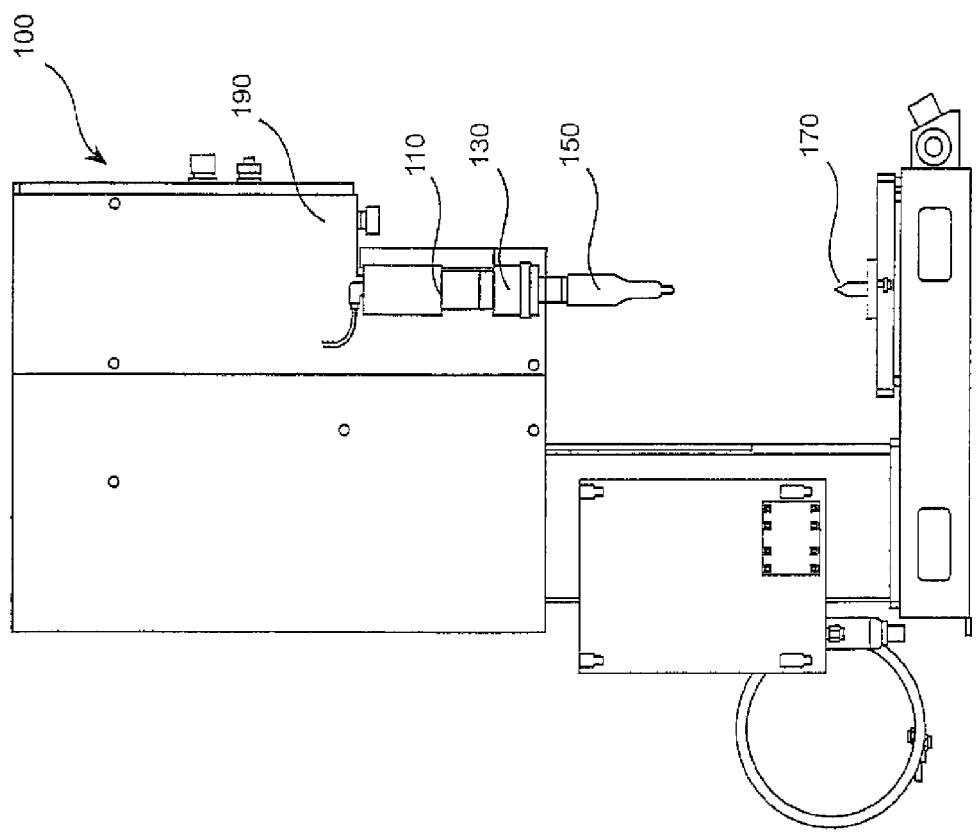
FIG. 10A is a side view of a prior art ultrasonic welding machine.

Retrofit of the advanced technology ultrasonic anvil and sonotrode onto existing form-fill-seal machines may require the removal of one or more heat sealing stations and any associated support brackets originally used to secure the heat station to a frame of the machine. The retrofit kit 10 or kit 10A may be supplied for installation thereon. Because of differences in the frame and other features of certain machines produced by various manufacturers, a horizontal machine spacer assembly 80 (FIGS. 3, 3A, 6, and 7) may be needed to properly position the kit so that the anvil and sonotrode are both properly displaced on opposite sides of the theoretical pouch mid-plane, as the pouches advance along the conveyor. Also, for a rotary form-fill-seal machine, such as the one shown in FIGS. 8 and 9, proper installation of the kit may also require support of the outward radially located end of the kit, through the use of a rotary machine column assembly 90.

Figure 5:
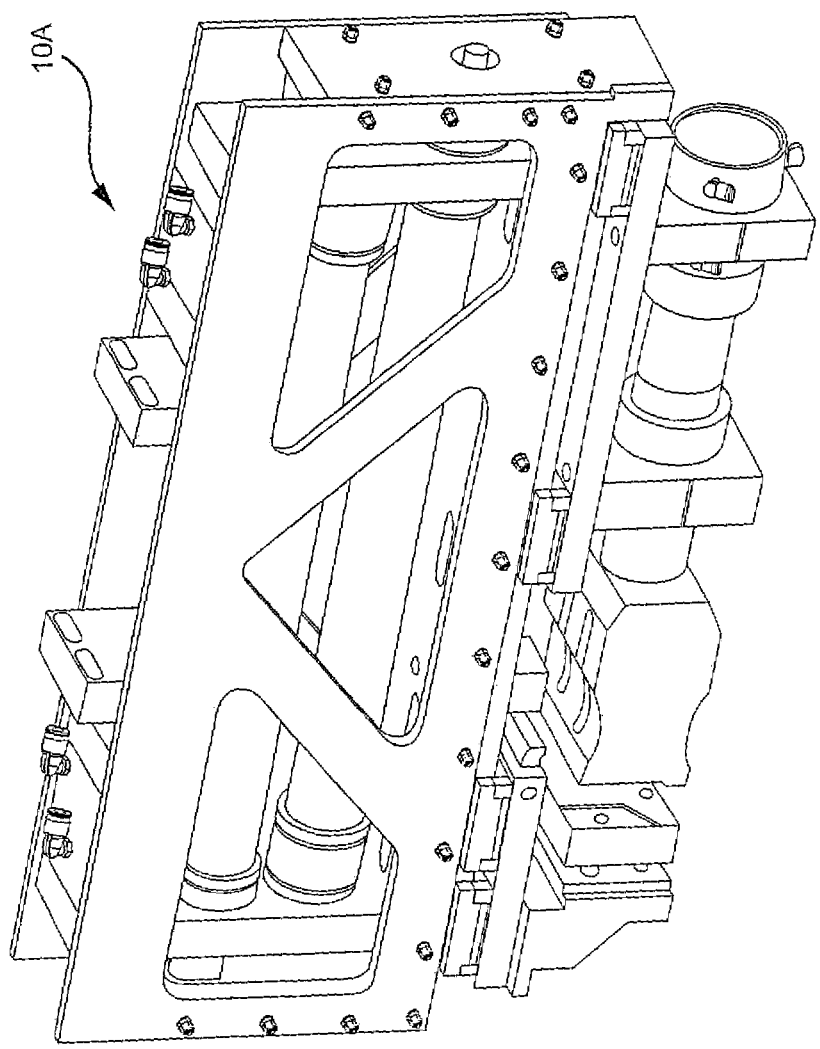
FIG. 5 is a perspective view of the retrofit kit of FIG. 3.
Figure 6:
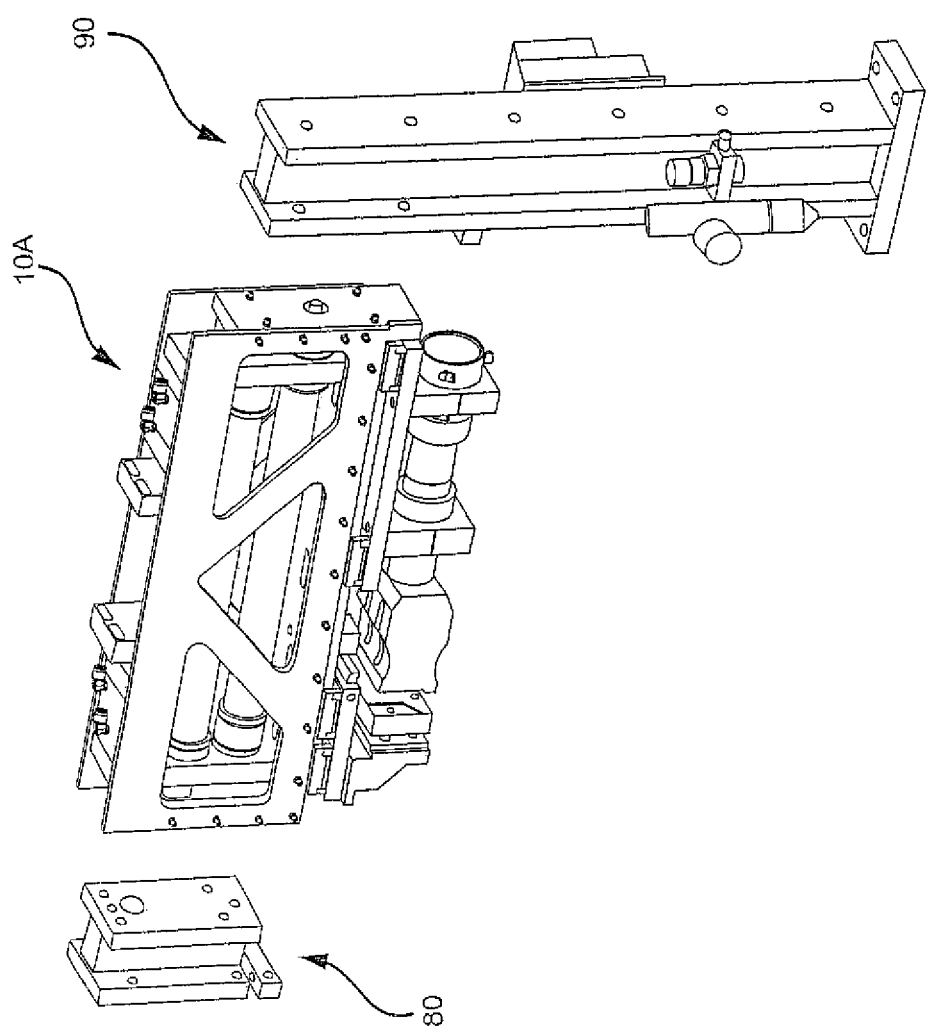
FIG. 6 is the perspective view of the retrofit kit of FIG. 5, being reduced in size and shown with an optional horizontal machine spacer, and with an optional rotary machine column assembly that may be configured with a fixed static height, or an adjustable height in the vertical ("Z") direction.

Each of the kits, as well as the horizontal machine spacer assembly 80 or the rotary machine column assembly 90, may require drilling of mounting holes into the frame of the machine that is to be retrofitted. As seen in FIG. 5, these holes may be located in one of the housing end walls 21/22 as pilot holes, which may then be used as a template for drilling common full size holes in both the kit and the machine's frame. Thereafter, the kit may be secured to the frame of either a horizontal or a rotary form-fill-seal machine using any suitable fastening means known to one skilled in the art, including, but not limited to, nuts, lock washers, and bolts.

The examples and descriptions provided merely illustrate a preferred embodiment of the present invention. Those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the preferred embodiment without departing from the spirit of this invention.

I claim:

1. An ultrasonic sealing station, for use in supporting an anvil and sonotrode of an ultrasonic welding stack of a form-fill-seal machine or pre-made pouch machine, said ultrasonic sealing station comprising:
   a housing;
   a linear rail with a portion fixedly secured to a portion of said housing;
   a first bearing carriage slidably received upon said linear rail;
   a second bearing carriage slidably received upon said linear rail;
   a first fluidic muscle;
   a second fluidic muscle;
   a first mounting member fixedly secured to said first bearing carriage to be slidable relative to said housing; said first fluidic muscle configured with a first end secured to a portion of said housing and with a second end secured to said first mounting member; said first mounting member configured to fixedly secure an anvil thereto;
   a second mounting member fixedly secured to said second bearing carriage to be slidable relative to said housing; said second fluidic muscle configured with a first end secured to a portion of said housing and with a second end secured to said second mounting member; said second mounting member configured to fixedly secure a sonotrode thereto;
   wherein said first and second fluidic muscles are configured to be pressurized to cause corresponding translation of said first and second mounting members relative to said housing, to cause convergent translation of said first and second mounting members.

2. The ultrasonic sealing station according to claim 1 further comprising:
   an anvil secured to said first mounting member;
   a sonotrode secured to said second mounting member; and
   wherein said respective securement of said anvil and sonotrode to said first and second mounting members is configured to cause engagement between a surface of said anvil and a surface of said sonotrode, by said convergent translation of said first and second mounting members.

3. The ultrasonic sealing station according to claim 2, wherein said engagement surface of said sonotrode configured to selectively engage said surface of said anvil comprises: a plurality of energy directors, said plurality of energy directors spaced in a first direction and in a second direction to form a pattern, each of said plurality of energy directors comprising a rectangular-shaped plateau surface with each side of said rectangular-shaped plateau surfaces configured to transition into an angled side surface to create a first, a second, a third, and a fourth angled side surface for each said plateau surface; each of said angled side surfaces of each said plateau surface being connected with another side surface of an adjacent plateau surface, except at an outer periphery of said sonotrode;
   wherein said engagement surface of said anvil configured to selectively engage said surface of said sonotrode comprises: a plurality of energy directors being spaced in a first direction and in a second direction to form a pattern, each of said plurality of energy directors comprising a rectangular-shaped plateau surface with each side of said rectangular-shaped plateau surfaces configured to transition into an angled side surface to create a first, a second, a third, and a fourth angled side surface for each said plateau surface; each of said angled side surfaces of each said plateau surface being connected with another side surface of an adjacent plateau surface, except at an outer periphery of said anvil; and
   wherein said energy directors of said sonotrode and said energy directors of said anvil are configured for alignment, whereby said side surfaces of said sonotrode plateaus interlock with said side surfaces of said anvil plateaus in a pattern, in both said first direction and said second direction, to be configured to transmit vibrations to ultrasonically weld thin work pieces.

4. The ultrasonic welding device according to claim 3 wherein said interlocking plurality of energy directors of said sonotrode and said anvil are configured to increase a total surface area of contact between said sonotrode and said anvil.

5. The ultrasonic welding device according to claim 3 wherein said angled side surfaces for each said plateau surface is at an angle of 45 degrees to said plateau surface.

6. The ultrasonic welding device according to claim 3 wherein each of said angled side surfaces of each said plateau surface are connected with another side surface of said adjacent plateau surface to form a trough therebetween.

7. The ultrasonic welding device according to claim 6 wherein each of said angled side surfaces of each said plateau surface are connected with another side surface of said adjacent plateau surface with a radiused surface therebetween to form said trough.

8. The ultrasonic welding device according to claim 3 wherein each said rectangular-shaped plateau surfaces are oriented to have each said side be at a 45 degree angle to a weld-line.

9. The ultrasonic welding device according to claim 3, wherein said second direction on said sonotrode is orthogonal to said first direction on said sonotrode, with said plurality of energy directors of said sonotrode being regularly spaced in said first sonotrode direction and regularly spaced in said second sonotrode direction to form a grid pattern thereon; and
   wherein said second direction on said anvil is orthogonal to said first direction on said anvil, with said plurality of energy directors of said anvil being regularly spaced in said first anvil direction and regularly spaced in said second anvil direction to form a grid pattern thereon.

10. The ultrasonic sealing station according to claim 2 wherein said first and second fluidic muscles are configured to be depressurized to cause reverse-translation and divergence of said first and second mounting members relative to said housing, to cause disengagement of said surface of said anvil from said surface of said sonotrode.

11. The ultrasonic sealing station according to claim 2 wherein said first fluidic muscle and said second fluidic muscle are substantially the same size, and are configured to provide a substantially equal amount of translation for said first mounting member and for said second muscle mounting member.

12. The ultrasonic sealing station according to claim 2 wherein said sonotrode is releasably secured to said second mounting member, said releasable securement comprising: a first pair of clamp blocks, with each being fixedly secured to said second mounting member, and a second pair of corresponding clamp blocks being respectively secured to said first set of clamp blocks using a set screw, to thereby releasably secure said sonotrode between said first pair of clamp blocks and said second pair of clamp blocks.

13. The ultrasonic sealing station according to claim 12 wherein said anvil is adjustably secured to said first mounting member, said adjustable securement comprising: a plurality of mounting feet threadably engaged within internally threaded orifices in said anvil, and a corresponding plurality of screws to secure said plurality of mounting feet to said first mounting member.

14. The ultrasonic sealing station according to claim 2 wherein said first and second fluidic muscles are secured to said housing, and respectively secured to said first and said second mounting members to form a narrow profile, with each said fluidic muscle disposed in-line with respect to said linear rail, and in-line with respect to said anvil and sonotrode.

15. The ultrasonic sealing station according to claim 14 wherein said first end of said first fluidic muscle is secured to said housing through an orifice in said second mounting member; and wherein said first end of said second fluidic muscle is secured to said housing through an orifice in said first mounting member.

16. A method of retrofitting one or more heat sealing elements of a form-fill-seal machine, with an advanced sonotrode and anvil, said method comprising:

removal of said one or more heat sealing elements and associated support brackets;
providing a retrofit kit, said retrofit kit comprising:
   a housing;
   a linear rail with a portion fixedly secured to a portion of said housing;
   a first bearing carriage slidably received upon said linear rail;
   a second bearing carriage slidably received upon said linear rail;
   a first fluidic muscle;
   a second fluidic muscle;
   a first mounting member fixedly secured to said first bearing carriage to be slidable relative to said housing; said first fluidic muscle configured with a first end secured to a portion of said housing and with a second end secured to said first mounting member; said first mounting member configured to fixedly secure an anvil thereto;
   a second mounting member fixedly secured to said second bearing carriage to be slidable relative to said housing; said second fluidic muscle configured with a first end secured to a portion of said housing and with a second end secured to said second mounting member; said second mounting member configured to fixedly secure a sonotrode thereto;
   an anvil secured to said first mounting member;
   a sonotrode secured to said second mounting member;
   wherein said first and second fluidic muscles are configured to be pressurized to cause corresponding translation of said first and second mounting members relative to said housing, to cause convergent translation of said first and second mounting members;
drilling mounting holes in a frame of the machine; and
installing said retrofit kit in the frame of the machine by securing said housing of said retrofit kit to the frame using a fastening means.

\* \* \* \* \*